United States Patent
Tseng

(10) Patent No.: US 9,548,876 B2
(45) Date of Patent: Jan. 17, 2017

(54) MULTIPLE TRANSMITTER SYSTEM AND METHOD FOR CONTROLLING IMPEDANCES OF MULTIPLE TRANSMITTER SYSTEM

(71) Applicant: MEDIATEK INC., Hsin-Chu (TW)

(72) Inventor: Kai-Hui Tseng, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/919,743

(22) Filed: Oct. 22, 2015

(65) Prior Publication Data
US 2016/0330048 A1 Nov. 10, 2016

Related U.S. Application Data

(60) Provisional application No. 62/157,469, filed on May 6, 2015.

(51) Int. Cl.
*H04L 27/00* (2006.01)
*H04L 25/03* (2006.01)
*H04L 29/06* (2006.01)

(52) U.S. Cl.
CPC ....... *H04L 25/03006* (2013.01); *H04L 65/607* (2013.01)

(58) Field of Classification Search
CPC .............................. H04L 1/0003; H04L 1/0071
USPC ....................................................... 375/295
See application file for complete search history.

(56) References Cited

U.S. PATENT DOCUMENTS

| 6,272,195 | B1 | 8/2001 | Verdun | |
| 8,779,819 | B1* | 7/2014 | Venditti | H03K 5/086 |
| | | | | 327/170 |
| 8,848,810 | B2 | 9/2014 | Lee et al. | |
| 2014/0258768 | A1* | 9/2014 | Chang | G06F 1/32 |
| | | | | 713/600 |
| 2016/0006544 | A1* | 1/2016 | Cowley | H04L 1/205 |
| | | | | 375/226 |

OTHER PUBLICATIONS

MIPI Alliance, Inc., Specification for C-PHY(SM), Aug. 5, 2014.
Theofilos A. Papadopoulos et al, MIMO Modeling and Data Rates for Medium-Voltage Narrowband-PLC in Smart Distribution Grids, 2014 5th IEEE PES Innovative Smart Grid Technologies Europe (ISGT Europe), Oct. 12-15, Istanbul, pp. 1-6, XP032730695, Oct. 12, 2014.

* cited by examiner

*Primary Examiner* — Helene Tayong
(74) *Attorney, Agent, or Firm* — Winston Hsu; Scott Margo

(57) ABSTRACT

A system includes a first transmitter, a second transmitter, a third transmitter and a controller, where the first transmitter is arranged for transmitting a first signal to a first transmission line, the second transmitter is arranged for transmitting a second signal to a second transmission line, and the third transmitter is arranged for transmitting a third signal to a third transmission line. The controller is coupled to the first transmitter, the second transmitter and the third transmitter, and is arranged for setting impedances of the first transmitter, the second transmitter and the third transmitter according to a coding jitter determination result.

20 Claims, 9 Drawing Sheets

| Present state [Rx_AB, Rx_BC, Rx_CA] | Previous state [Rx_AB, Rx_BC, Rx_CA] | | | | | |
|---|---|---|---|---|---|---|
| | +x [100] | -x [011] | +y [010] | -y [101] | +z [001] | -z [110] |
| +x State [100] | n/a | 1xx | 000 | 001 | 010 | 011 |
| -x State [011] | 1xx | n/a | 001 | 000 | 011 | 010 |
| +y State [010] | 010 | 011 | n/a | 1xx | 000 | 001 |
| -y State [101] | 011 | 010 | 1xx | n/a | 001 | 000 |
| +z State [001] | 000 | 001 | 010 | 011 | n/a | 1xx |
| -z State [110] | 001 | 000 | 011 | 010 | 1xx | n/a |

Symbol value above= [Rx_Flip, Rx_Rotation, Rx_Polarity]

FIG. 3

| X→Y | -X→-Y | Y→Z | -Y→-Z | Z→X | -Z→-X |
|---|---|---|---|---|---|
| RA: 50Ω | RA: 50Ω | RA: 75Ω | RA: 75Ω | RA: 25Ω | RA: 25Ω |
| RB: 25Ω | RB: 25Ω | RB: 50Ω | RB: 50Ω | RB: 75Ω | RB: 75Ω |
| RC: 75Ω | RC: 75Ω | RC: 25Ω | RC: 25Ω | RC: 50Ω | RC: 50Ω |

| X→Z | -X→-Z | Y→X | -Y→-X | Z→Y | -Z→-Y |
|---|---|---|---|---|---|
| RA: 25Ω | RA: 25Ω | RA: 75Ω | RA: 75Ω | RA: 50Ω | RA: 50Ω |
| RB: 50Ω | RB: 50Ω | RB: 25Ω | RB: 25Ω | RB: 75Ω | RB: 75Ω |
| RC: 75Ω | RC: 75Ω | RC: 50Ω | RC: 50Ω | RC: 25Ω | RC: 25Ω |

FIG. 5

MULTIPLE TRANSMITTER SYSTEM AND METHOD FOR CONTROLLING IMPEDANCES OF MULTIPLE TRANSMITTER SYSTEM

CROSS REFERENCE TO RELATED APPLICATIONS

This application claims the priority of U.S. Provisional Application No. 62/157,469, filed on May 6, 2015, which is included herein by reference in its entirety.

BACKGROUND

Recently, C-PHY was provided to describe a high-speed, rate-efficient PHY, especially suited for mobile applications where channel rate limitations are a factor. In the C-PHY specification, a practical PHY configuration consists of one or more three-wire lanes, each lane has six driven states (also called wire states), the driven state of the lane is changed every driving period, and the signals provided by the three wires of the lane are received using a group of three differential receivers. However, when a state transition of the three-wire lane happens, output signals of the three differential receivers may not have the same timing of the zero-cross point, causing an inter-symbol interference and coding jitter issue in the following data clock recovery operation. Therefore, how to provide a method to eliminate the coding jitter is an important topic.

SUMMARY

It is therefore an objective of the present invention to provide a system having multiple transmitters and method for controlling impedances of multiple transmitters of system, which can improve the coding jitter, to solve the above-mentioned problem.

According to one embodiment of the present invention, a system comprises a first transmitter, a second transmitter, a third transmitter and a controller, where the first transmitter is arranged for transmitting a first signal to a first transmission line, the second transmitter is arranged for transmitting a second signal to a second transmission line, and the third transmitter is arranged for transmitting a third signal to a third transmission line. The controller is coupled to the first transmitter, the second transmitter and the third transmitter, and is arranged for setting impedances of the first transmitter, the second transmitter and the third transmitter according to a coding jitter determination result.

According to another embodiment of the present invention, a method for controlling impedances of multiple transmitters of a system comprises: controlling a first transmitter to transmit a first signal to a first transmission line; controlling a second transmitter to transmit a second signal to a second transmission line; controlling a third transmitter to transmit a third signal to a third transmission line; and setting the impedances of the first transmitter, the second transmitter and the third transmitter according to a coding jitter determination result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows every state transition and the state transitions that cause coding jitters.

FIG. 5 shows the twelve state transitions shown in FIG. 3 with the shaded areas and corresponding resistances setting.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
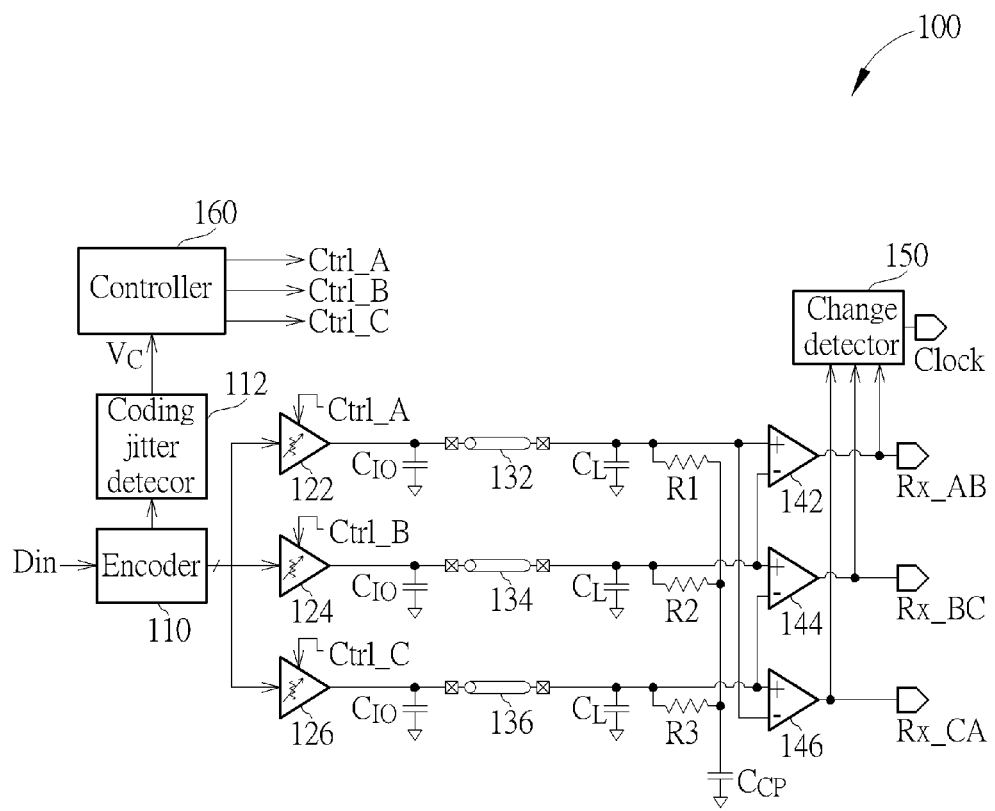
FIG. 1 is a diagram illustrating a system according to one embodiment of the present invention.

Please refer to FIG. 1, which is a diagram illustrating a system 100 according to one embodiment of the present invention. As shown in FIG. 1, the system comprises a transmitter side and a receiver side, and the transmitter side is coupled to the receiver side via three channels 132, 134 and 136. The transmitter side comprises an encoder 110, a coding jitter detector 112, three transmitters 122, 124 and 126, and a controller 160. The receiver side comprises resistors R1-R3, three differential receivers 142, 144 and 146, and a change detector 150. Furthermore, the symbols CIO, CL and CCP shown in FIG. 1 are capacitors. In this embodiment, the three channels 132, 134 and 136 can be any type of conductive line or wire, and the system 100 is complied with the C-PHY standard.

In this embodiment, each of the three transmitters 122, 124 and 126 has one or more variable resistors built therein, that is the resistances of the transmitters 122, 124 and 126 can be controlled/adjusted.

In the operations of the system 100, the encoder 110 receives and encodes input data Din to generate encoded signals to the transmitters 122, 124 and 126, respectively. Meanwhile, the coding jitter detector 112 estimates or predicts whether the encoded signals cause a coding jitter in the receiver side to generate signals Vc, where the signals Vc are used to control the setting/adjustment of the resistances of the transmitters 122, 124 and 126, respectively. When the coding jitter detector 112 estimates or predicts that the current encoded signals cause the coding jitter in the receiver side, the controller 160 outputs the control signals Ctrl_A-Ctrl_C to set the transmitters 122, 124 and 126 to have different impedances; and when the coding jitter detector 112 estimates or determines that the current encoded signals does not cause the coding jitter in the receiver side, the controller 160 outputs the default control signals to set the transmitters 122, 124 and 126 to have the same impedances.

Then, the transmitters 122, 124 and 126 transmit a first signal, a second signal and a third signal, corresponding to the encoded signals, to the channels 132, 134 and 136, respectively. The differential receivers 142, 144 and 146 receive the signals from the channels 132, 134 and 136 and output the output signals Rx_AB, RX_DC and Rx_CA, respectively. The change detector 150 generates a clock signal according to the output signals Rx_AB, RX_BC and Rx_CA.

Figure 2A:
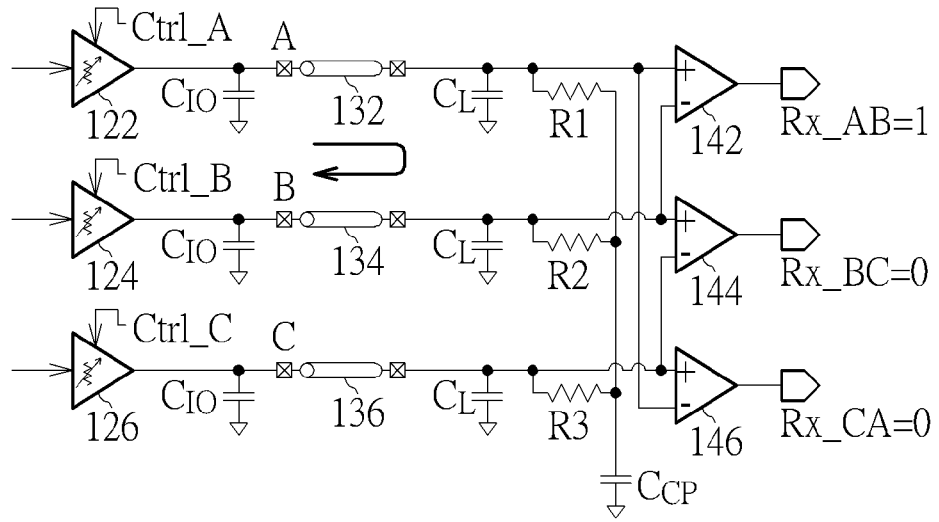
FIGS. 2A-2C are diagrams showing six states of the system.
Figure 2A:
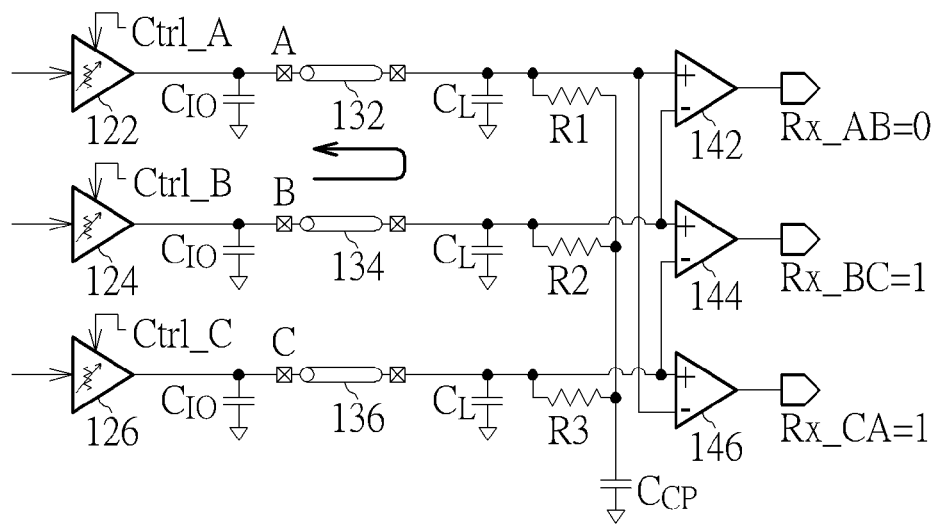
Figure 2B:
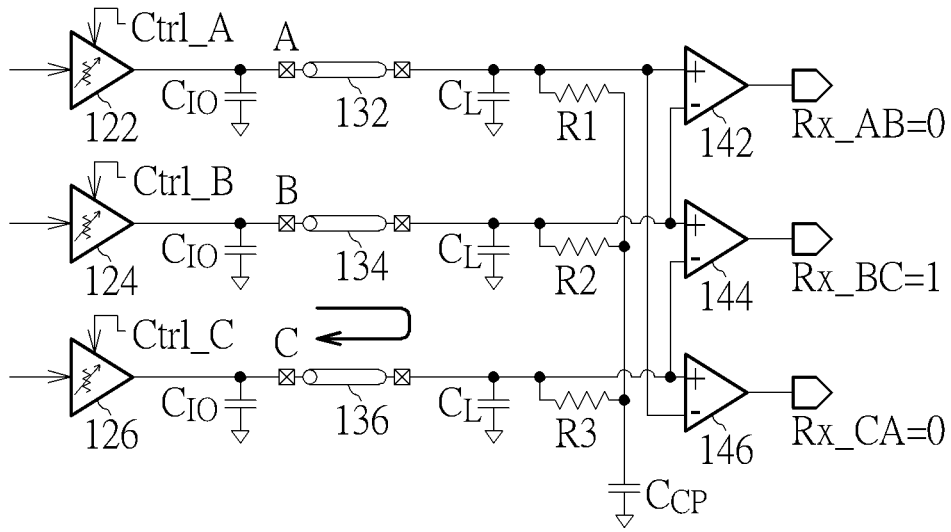
Figure 2B:
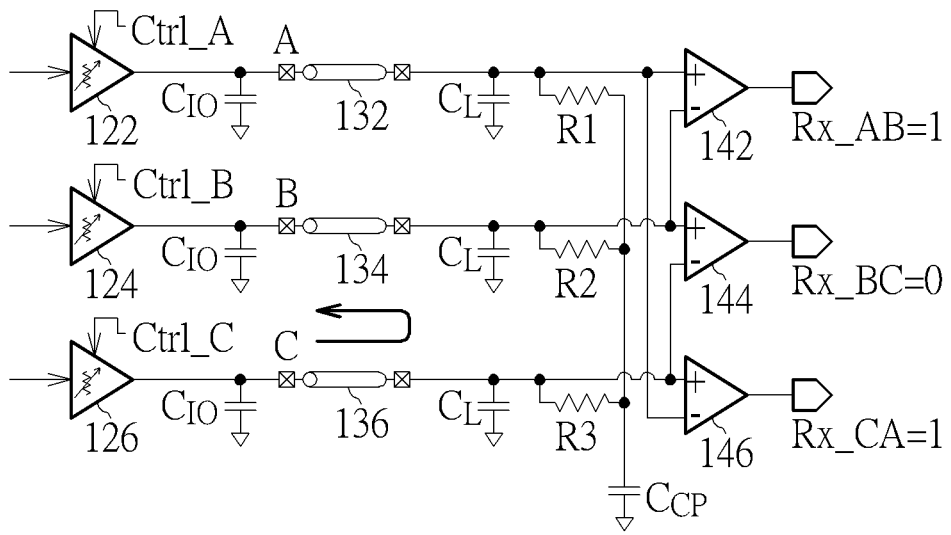
Figure 2C:
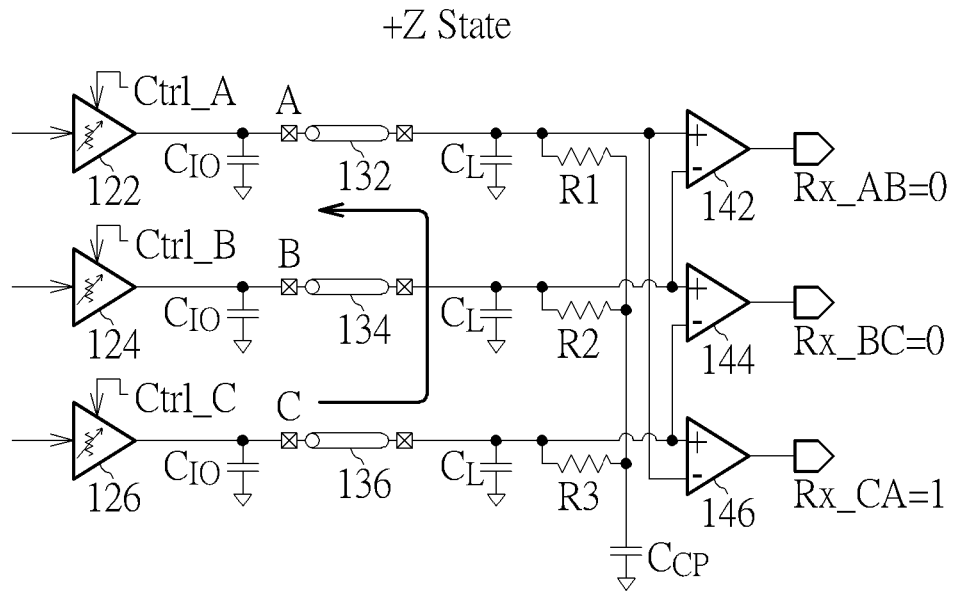
Figure 2C:
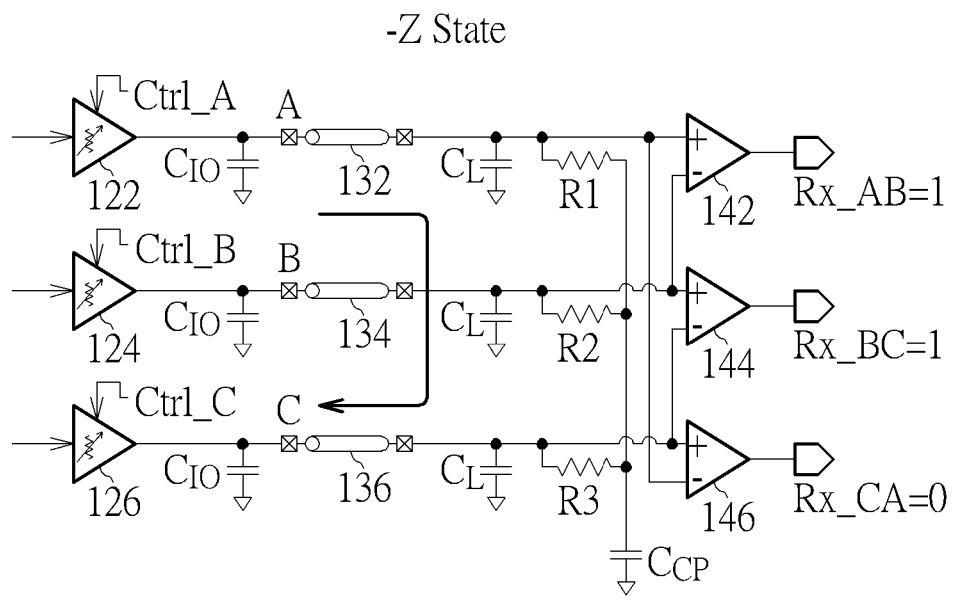

In detail, referring to FIGS. 2A-2C, which are diagrams showing six states of the system. 100. In a first state, hereinafter "+X state", the transmitter 122 is arranged to drive the transmitter 124 (that is the node A is driven high while the node B is driven low), and the transmitter 126 is un-driven; in a second state, hereinafter "−X state", the transmitter 124 is arranged to drive the transmitter 122 (that is the node A is driven high while the node B is driven low), and the transmitter 126 is un-driven; in a third state, hereinafter "+Y state", the transmitter 124 is arranged to drive the transmitter 126 (that is the node B is driven high while the node C is driven low), and the transmitter 122 is un-driven; in a fourth state, hereinafter "−Y state", the transmitter 126 is arranged to drive the transmitter 124 (that is the node C is driven high while the node B is driven low), and the transmitter 122 is un-driven; in a fifth state, hereinafter "+Z state", the transmitter 126 is arranged to drive the transmitter 122 (that is the node C is driven high while the node A is driven low), and the transmitter 124 is un-driven; and in a sixth state, hereinafter "−Z state", the transmitter 122 is arranged to drive the transmitter 126 (that is the node A is driven high while the node C is driven low), and the transmitter 124 is un-driven.

Figure 4:
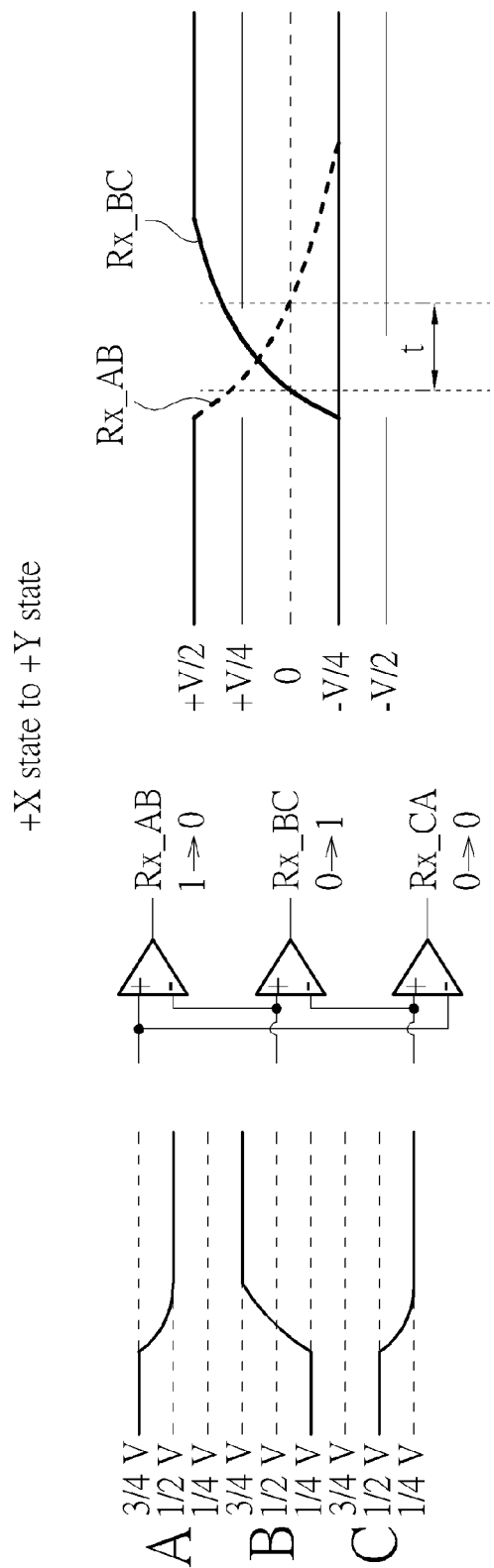
FIG. 4 shows a serious coding jitter occurs in the state transition from the +X state to the +Y state.

When the system 100 needs to change the states (state transition), the receivers 142, 144 and 146 may or may not suffer the coding jitter issue. FIG. 3 shows every state transition and the state transitions that cause coding jitters. As shown in FIG. 3, when the state transition belongs to a first group comprising +X state to +Y state, +X state to +Z state, −X state to −Y state, −X state to −Z state, +Y state to +X state, +Y state to +Z state, −Y state to −X state, −Y state to −Z state, +Z state to +X state, +Z state to +Y state, −Z state to −X state, and −Z state to −Y state, the coding jitter issue may happen. In detail, referring to FIG. 4, which shows a coding jitter occurs in the state transition from the +X state to the +Y state. As shown in FIG. 4, the zero crossing points of the output signals Rx_AB and Rx_BC have a large time difference "t", that is the serious coding jitter.

To solve the coding jitter issues in the state transitions as described above, taking FIG. 4 as an example, to make the output signals Rx_AB and Rx_BC to have closer zero crossing points, the system 100 may speed up the output signal Rx_AB and slow down the output signal Rx_BC to achieve this target. In detail, because the speed of the voltage transition depends on the RC time constant, therefore, in this embodiment, when the state transition is from +X state to +Y state, before the transmitters 122, 124 and 126 transmit the signals corresponding to the +Y state, the controller 160 may decrease the resistance of the transmitter 124 and increase the resistance of the transmitter 126 to speed up the output signal Rx_AB and slow down the output signal Rx_BC. In one embodiment, the resistances of the transmitters 122, 124 and 126 are 50Ω, 25Ω and 75Ω, respectively.

FIG. 5 shows the twelve state transitions shown in FIG. 3 with the shaded areas and corresponding resistances setting. As shown in FIG. 5, when the coding jitter detector 112 detects that the transmitters 122, 124 and 126 change from +X state to +Y state, the controller 160 controls the transmitters 122, 124 and 126 to have the resistances 50Ω, 25Ω and 75Ω, respectively; when the coding jitter detector 112 detects that the transmitters 122, 124 and 126 change from +X state to +Z state, the controller 160 controls the transmitters 122, 124 and 126 to have the resistances 25Ω, 50Ω and 75Ω, respectively; when the coding jitter detector 112 detects that the transmitters 122, 124 and 126 change from −X state to −Y state, the controller 160 controls the transmitters 122, 124 and 126 to have the resistances 50Ω, 25Ω and 75Ω, respectively, . . . and so on. It is noted that the resistances shown in FIG. 5 are for illustrative purposes only, not a limitation of present invention. As long as the impedances of the transmitters 122, 124 and 126 can be set to make the zero crossing point of the output signals closer, the impedances of the of the transmitters 122, 124 and 126 may have other setting values. By using the resistance setting concept shown in FIG. 5, the coding jitter or the outputs can be improved.

In addition, when the coding jitter detector 112 detects that the transmitters 122, 124 and 126 have a state transition belongs to a second group comprising the state transitions not shown in FIG. 5 (that is the state transition with the blank area shown in FIG. 3), the controller 160 uses a default setting to set the resistances of the transmitters 122, 124 and 126. For example, the controller 160 may control the transmitters 122, 124 and 126 to have the same resistances, e.g. 50Ω.

In addition, when the controller 160 controls the transmitters 122, 124 and 126 to have different resistances, the driving strengths of the transmitters 122, 124 and 126 are changed accordingly, and the signal strength at the receiver side may be slightly changed. To solve this problem, in one embodiment, when a state transition of the system belongs to the shaded areas shown in FIG. 3, within a symbol period, the controller 160 sets the transmitters 122, 124 and 126 to have different impedances shown in FIG. 5, and then the controller resets the transmitters 122, 124 and 126 to have substantially the same impedances (default setting). In detail, taking FIG. 4 as an example, if the coding jitter detector 112 detects that the transmitters 122, 124 and 126 change from +X state to +Y state, the controller 160 controls the transmitters 122, 124 and 126 to have the resistances 50Ω, 25Ω and 75Ω respectively first, and the transmitters 122, 124 and 126 start to transmit the signals to the channels 132, 134 and 136, respectively. Then, after the zero crossing point (e.g. the middle point of the transition period, or the time RC*ln 2), the controller 160 may immediately control the transmitters 122, 124 and 126 to have the same resistances 50Ω.

Figure 6:
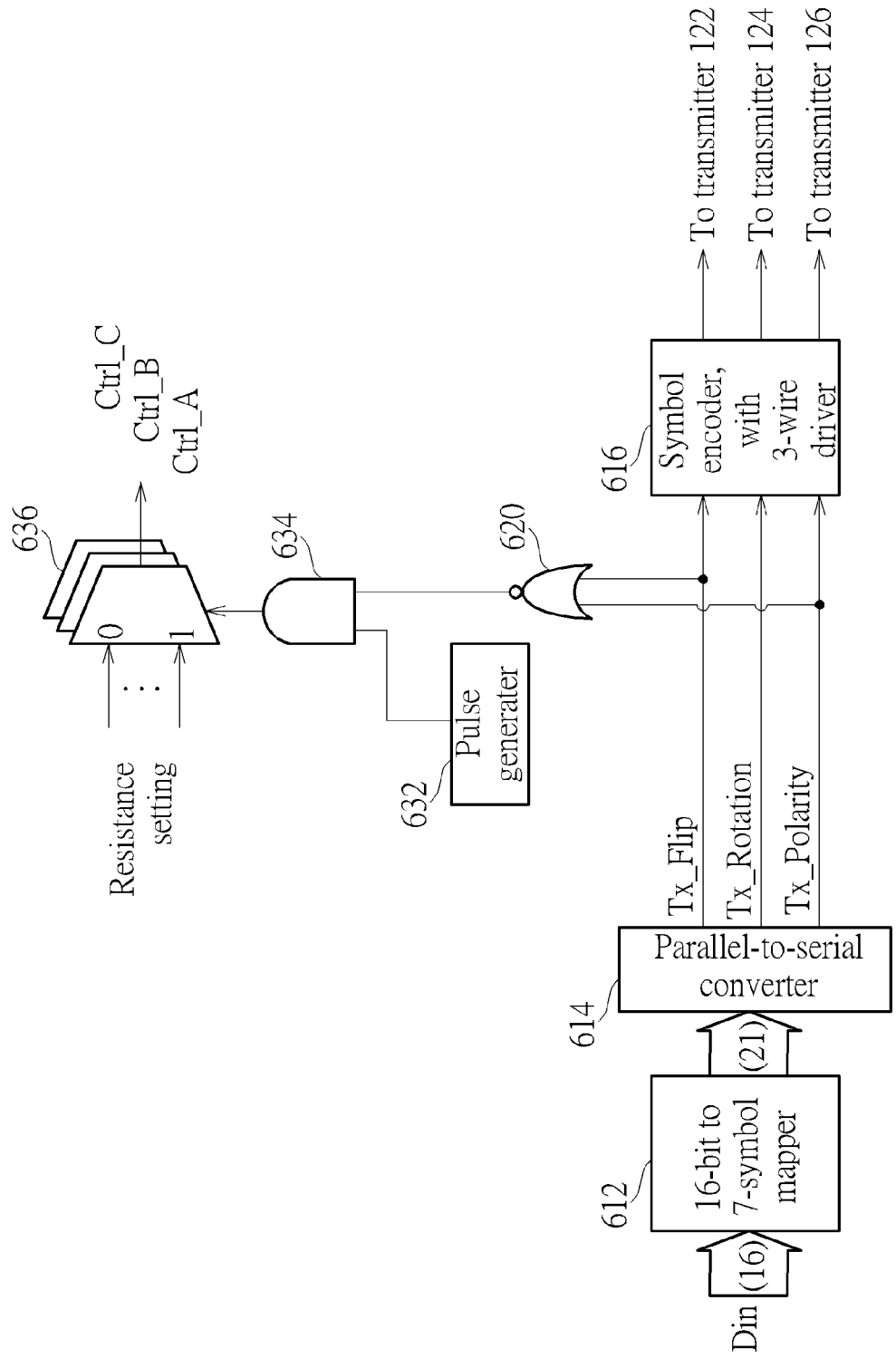
FIG. 6 is a diagram illustrating the encoder, coding jitter detector and controller shown in FIG. 1 according to one embodiment of the present invention.

FIG. 6 is a diagram illustrating the encoder 110, coding jitter detector 112 and controller 160 according to one embodiment of the present invention. As shown in FIG. 6, the encoder 110 may comprise a 16 bit to 7 symbol mapper 612, a parallel to serial converter 614, and a symbol encoder with 3-wire driver 616; the coding jitter detector 112 may be implemented by an NOR gate 620; and the controller 160 may comprise a pulse generator 632, an AND gate 634 and a plurality of multiplexers 636. It is noted that the circuit structures show FIG. 6 are for illustrative purposes only, not a limitation of the present invention.

In FIG. 6, the input data Din is 16 bit data, and the 16 bit to 7 symbol mapper 612 converts the 16 bit data to seven channel symbols, where each symbol comprises 3 bits. Then the seven symbols are serialized by the parallel to serial converter 614 and sent one symbol at a time to the symbol encoder with 3-wire driver 616 to drive the transmitters 122, 124 and 126, where each symbol comprises three bits Tx_Flip, Tx_Rotation and Tx_Polarity. The coding jitter detector 112 (e.g. the NOR gate 620) may determine whether the state transition may cause the coding jitter in the receiver end by using the bits Tx_Flip and Tx_Polarity. In detail, referring to FIG. 3, when both the bits Tx_Flip and Tx_Polarity are logical "0" (Tx_Flip and Tx_Polarity are the same as Rx Flip and Rx Polarity shown in FIG. 3), the NOR gate 620 outputs "1" to indicate that the state transition causes the coding jitter in the receiver end; and when one of the bits Tx_Flip and Tx_Polarity is not logical "0", the NOR gate 620 outputs "0" to indicate that the state transition does not cause the coding jitter in the receiver end.

When NOR gate 620 outputs "1" to indicate that the state transition cause the coding jitter in the receiver end, the pulse generator 632 may send a pulse to the AND gate 634, and the AND gate 634 outputs "1" to control the multiplexers 636 to output the control signals Ctrl_A, Ctrl_B and Ctrl_C to control the transmitters 122, 124 and 126 to have different resistances such as the embodiments shown in FIG. 5. In addition, when NOR gate 620 outputs "0" to indicate that the state transition does not cause the coding jitter in the receiver end, the AND gate 634 outputs "0" to control the multiplexers 636 to output the control signals Ctrl_A, Ctrl_B and Ctrl_C to control the transmitters 122, 124 and 126 to have the default setting, e.g. the same resistances 50Ω.

Figure 7:
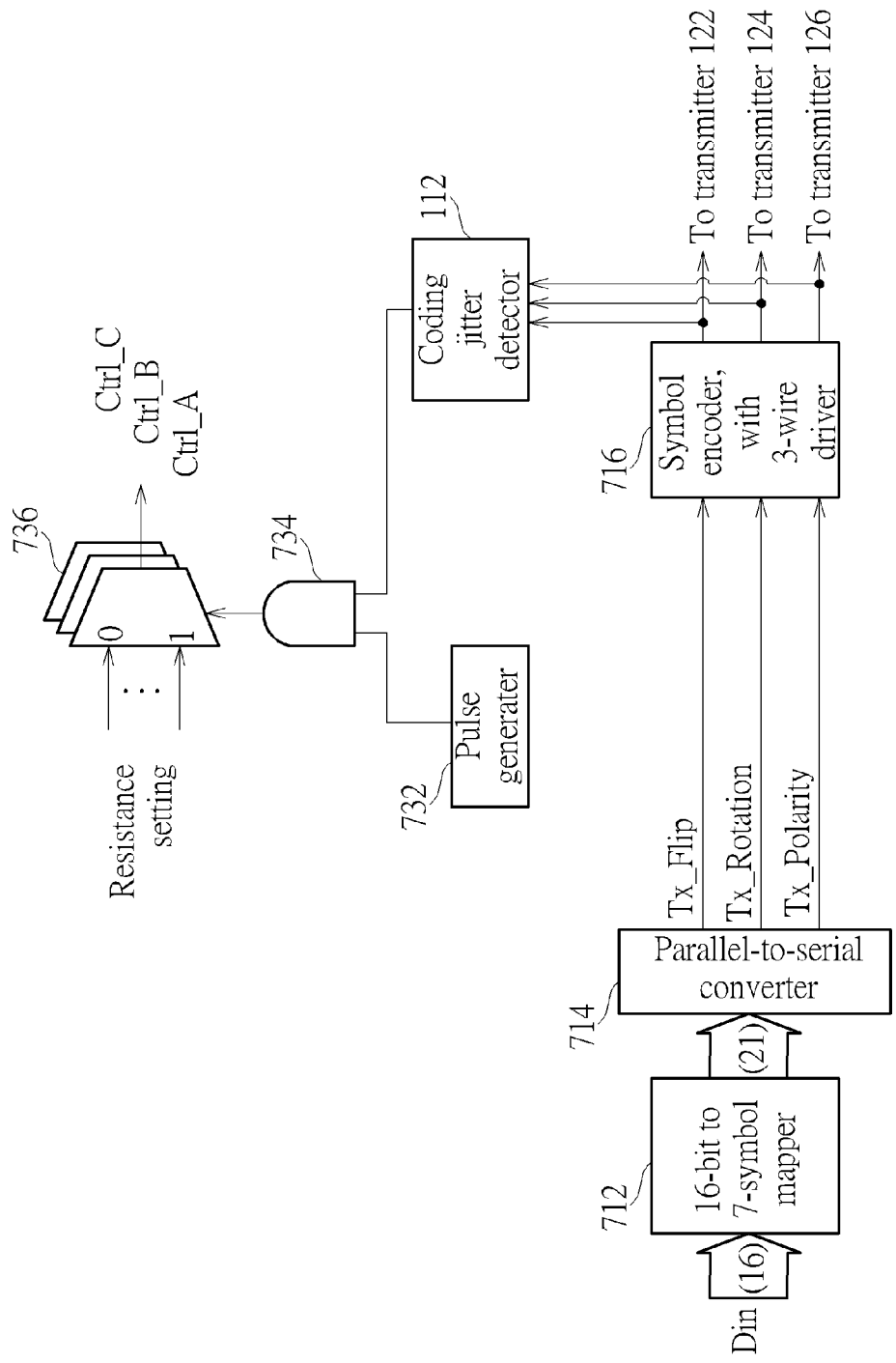
FIG. 7 is a diagram illustrating the encoder, coding jitter detector and controller shown in FIG. 1 according to another embodiment of the present invention.

FIG. 7 is a diagram illustrating the encoder 110, coding jitter detector 112 and controller 160 according to another embodiment of the present invention. As shown in FIG. 7, the encoder 110 may comprise a 16 bit to 7 symbol mapper 712, a parallel to serial converter 714, and a symbol encoder with 3-wire driver 716; and the controller 160 may comprise a pulse generator 732, an AND gate 734 and a plurality of multiplexers 736. It is noted that the circuit structures show FIG. 7 are for illustrative purposes only, not a limitation of the present invention.

In FIG. 7, the input data Din is 16 bit data, and the 16 bit to 7 symbol mapper 712 converts the 16 bit data to seven channel symbols, where each symbol comprises 3 bits. Then the seven symbols are serialized by the parallel to serial converter 714 and sent one symbol at a time to the symbol encoder with 3-wire driver 716 to drive the transmitters 122, 124 and 126, where each symbol comprises three bits Tx_Flip, Tx_Rotation and Tx_Polarity. The coding jitter detector 112 may determine whether the state transition may cause the coding jitter in the receiver end according to the outputs of the symbol encoder with 3-wire driver 716. When the coding jitter detector 112 determines that the state transition causes the coding jitter in the receiver end, the coding jitter detector 112 outputs "1" to the AND gate 734; and when the coding jitter detector 112 determines that the state transition does not cause the coding jitter in the receiver end, the coding jitter detector 112 outputs "0" to the AND gate 734.

When coding jitter detector 112 outputs "1" to indicate that the state transition causes the coding jitter in the receiver end, the pulse generator 732 may send a pulse to the AND gate 734, and the AND gate 734 outputs "1" to control the multiplexers 736 to output the control signals Ctrl_A, Ctrl_B and Ctrl_C to control the transmitters 122, 124 and 126 to have different resistances such as the embodiments shown in FIG. 5. In addition, when coding jitter detector 112 outputs "0" to indicate that the state transition does not cause the coding jitter in the receiver end, the AND gate 734 outputs "0" to control the multiplexers 736 to output the control signals Ctrl_A, Ctrl_B and Ctrl_C to control the transmitters 122, 124 and 126 to have the default setting, e.g. the same resistances 50Ω.

Briefly summarized, in the system having multiple transmitters and the method for controlling impedances of multiple transmitters of system, the coding jitter detector and the controller can control the transmitters to have appropriate resistance setting by referring to the following state transition. By using the method of the present invention, the coding jitter can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system, comprising:
   a first transmitter, for transmitting a first signal to a first transmission line;
   a second transmitter, for transmitting a second signal to a second transmission line;
   a third transmitter, for transmitting a third signal to a third transmission line;
   a coding jitter detector, for generating a coding jitter determination result according to a state transition of the system; and
   a controller, coupled to the first transmitter, the second transmitter, the third transmitter and the coding jitter detector, for setting impedances of the first transmitter, the second transmitter and the third transmitter according to the coding jitter determination result;
   wherein when the state transition of the system belongs to a first group, the controller sets the first transmitter, the second transmitter and the third transmitter to have different impedances; and when the state transition of the system belongs to a second group, the controller sets the first transmitter, the second transmitter and the third transmitter to have substantially same impedances.

2. The system of claim 1, wherein the system has six states: in a first state the first transmitter is arranged to drive the second transmitter while the third transmitter is un-driven, in a second state the second transmitter is arranged to drive the first transmitter while the third transmitter is un-driven, in a third state the second transmitter is arranged to drive the third transmitter while the first transmitter is un-driven, in a fourth state the third transmitter is arranged to drive the second transmitter while the first transmitter is un-driven, in a fifth state the third transmitter is arranged to drive the first transmitter while the second transmitter is un-driven, and in a sixth state the first transmitter is arranged to drive the third transmitter while the second transmitter is un-driven; and the first group comprises at least a portion of: the first state to the third state, the first state to the fifth state, the second state to the fourth state, the second state to the sixth state, the third state to the fifth state, the fourth state to the second state, the fourth state to the sixth state, the fifth state to the first state, the fifth state to the third state, the sixth state to the second state, and the sixth state to the fourth state.

3. The system of claim 1, wherein when the state transition of the system belongs to the first group, within a symbol period, the controller sets the first transmitter, the second transmitter and the third transmitter to have different impedances, and then the controller sets the first transmitter, the second transmitter and the third transmitter to have substantially the same impedances.

4. The system of claim 1, further comprising:
an encoder, for encoding input data to generate encoded data to drive the first transmitter, the second transmitter and the third transmitter to output the first signal, the second signal and the third signal, respectively.

5. A system, comprising:
a first transmitter, for transmitting a first signal to a first transmission line;
a second transmitter, for transmitting a second signal to a second transmission line;
a third transmitter, for transmitting a third signal to a third transmission line;
an encoder, for encoding input data to generate encoded data to drive the first transmitter, the second transmitter and the third transmitter to output the first signal, the second signal and the third signal, respectively; and
a coding jitter detector, for generating a coding jitter determination result directly based on contents of the input data of the encoder; and
a controller, coupled to the first transmitter, the second transmitter, the third transmitter and the coding jitter detector, for setting impedances of the first transmitter, the second transmitter and the third transmitter according to the coding jitter determination result.

6. The system of claim 5, wherein the input data comprises at least a flip bit and a polarity bit, and the coding jitter detector generates the coding jitter determination result according to the flip bit and the polarity bit.

7. The system of claim 6, wherein when both the flip bit and the polarity bit are a first logic value, the controller sets the first transmitter, the second transmitter and the third transmitter to have different impedances; and when one of the flip bit and the polarity bit is not the first logic value, the controller sets the first transmitter, the second transmitter and the third transmitter to have substantially same impedances.

8. The system of claim 6, wherein when both the flip bit and the polarity bit are a first logic value, within a symbol period, the controller sets the first transmitter, the second transmitter and the third transmitter to have different impedances, and then the controller sets the first transmitter, the second transmitter and the third transmitter to have substantially the same impedances.

9. A method for controlling impedances of multiple transmitters of a system, comprising:
controlling a first transmitter to transmit a first signal to a first transmission line;
controlling a second transmitter to transmit a second signal to a second transmission line;
controlling a third transmitter to transmit a third signal to a third transmission line;
generating a coding jitter determination result according to a state transition of the system;
when the state transition of the system belongs to a first group, setting the first transmitter, the second transmitter and the third transmitter to have different impedances according to the coding jitter determination result; and
when the state transition of the system belongs to a second group, setting the first transmitter, the second transmitter and the third transmitter to have substantially same impedances according to the coding jitter determination result.

10. The method of claim 9, wherein the system has six states: in a first state the first transmitter is arranged to drive the second transmitter while the third transmitter is un-driven, in a second state the second transmitter is arranged to drive the first transmitter while the third transmitter is un-driven, in a third state the second transmitter is arranged to drive the third transmitter while the first transmitter is un-driven, in a fourth state the third transmitter is arranged to drive the second transmitter while the first transmitter is un-driven, in a fifth state the third transmitter is arranged to drive the first transmitter while the second transmitter is un-driven, and in a sixth state the first transmitter is arranged to drive the third transmitter while the second transmitter is un-driven; and the first group comprises at least a portion of: the first state to the third state, the first state to the fifth state, the second state to the fourth state, the second state to the sixth state, the third state to the fifth state, the fourth state to the second state, the fourth state to the sixth state, the fifth state to the first state, the fifth state to the third state, the sixth state to the second state, and the sixth state to the fourth state.

11. The method of claim 9, wherein the step of setting the impedances of the first transmitter, the second transmitter and the third transmitter comprises:
when the state transition of the system belongs to the first group, within a symbol period, setting the first transmitter, the second transmitter and the third transmitter to have different impedances, and then setting the first transmitter, the second transmitter and the third transmitter to have substantially the same impedances.

12. The method of claim 9, further comprising:
encoding input data to generate encoded data to drive the first transmitter, the second transmitter and the third transmitter to output the first signal, the second signal and the third signal, respectively.

13. A method for controlling impedances of multiple transmitters of a system, comprising:
controlling a first transmitter to transmit a first signal to a first transmission line;
controlling a second transmitter to transmit a second signal to a second transmission line;
controlling a third transmitter to transmit a third signal to a third transmission line;
encoding input data to generate encoded data to drive the first transmitter, the second transmitter and the third transmitter to output the first signal, the second signal and the third signal, respectively;
generating a coding jitter determination result directly based on contents of the input data; and
setting impedances of the first transmitter, the second transmitter and the third transmitter according to the coding jitter determination result.

14. The method of claim 13, wherein the input data comprises a flip bit and a polarity bit, and the step of generating the coding jitter determination result comprises:
generating the coding jitter determination result according to the flip bit and the polarity bit.

15. The method of claim 14, wherein the step of setting the impedances of the first transmitter, the second transmitter and the third transmitter comprises:
when both the flip bit and the polarity bit are a first logic value, setting the first transmitter, the second transmitter and the third transmitter to have different impedances; and when one of the flip bit and the polarity bit is not the first logic value, setting the first transmitter, the second transmitter and the third transmitter to have substantially same impedances.

16. The method of claim 14, wherein the step of setting the impedances of the first transmitter, the second transmitter and the third transmitter comprises:
when both of the flip bit and the polarity bit are a first logic value, within a symbol period, setting the first transmitter, the second transmitter and the third transmitter to have different impedances, and then setting the first transmitter, the second transmitter and the third transmitter to have substantially the same impedances.

17. A system, comprising:
a first transmitter, for transmitting a first signal to a first transmission line;
a second transmitter, for transmitting a second signal to a second transmission line;
a third transmitter, for transmitting a third signal to a third transmission line;
a coding jitter detector, for generating a coding jitter determination result by determining whether a state transition of the system causes a coding jitter in a receiver end or not; and
a controller, coupled to the first transmitter, the second transmitter, the third transmitter and the coding jitter detector, for setting impedances of the first transmitter, the second transmitter and the third transmitter according to the coding jitter determination result.

18. The system of claim 17, wherein the coding jitter is a time difference between two zero crossing points of two output signals outputted by two receivers.

19. A method for controlling impedances of multiple transmitters of a system, comprising:
controlling a first transmitter to transmit a first signal to a first transmission line;
controlling a second transmitter to transmit a second signal to a second transmission line;
controlling a third transmitter to transmit a third signal to a third transmission line;
generating a coding jitter determination result by determining whether a state transition of the system causes a coding jitter in a receiver end or not; and
setting the impedances of the first transmitter, the second transmitter and the third transmitter according to the coding jitter determination result.

20. The method of claim 19, wherein the coding jitter is a time difference between two zero crossing points of two output signals outputted by two receivers.

* * * * *